(12) United States Patent
Broy et al.

(10) Patent No.: US 11,303,101 B2
(45) Date of Patent: Apr. 12, 2022

(54) DEVICE FOR PREPARING A HIGH-VOLTAGE DIRECT CURRENT TRANSMISSION, CONVERTER STATION AND ENERGY PROVIDING SYSTEM

(71) Applicant: SIEMENS AKTIENGESELLSCHAFT, Munich (DE)

(72) Inventors: Alexander Broy, Fuerth (DE); Matthias Foehr, Langenzenn (DE); Gerald Franz Giering, Kalchreuth (DE); Ulrich Halfmann, Langensendelbach (DE); Marcus Zeller, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 86 days.

(21) Appl. No.: 16/898,678

(22) Filed: Jun. 11, 2020

(65) Prior Publication Data

US 2020/0395741 A1    Dec. 17, 2020

(30) Foreign Application Priority Data

Jun. 11, 2019 (EP) .................................... 19179406

(51) Int. Cl.
*H02B 1/20*    (2006.01)
*H02G 9/02*    (2006.01)
(Continued)

(52) U.S. Cl.
CPC ................. *H02B 1/20* (2013.01); *H02B 1/26* (2013.01); *H02G 9/02* (2013.01); *H02J 3/36* (2013.01);
(Continued)

(58) Field of Classification Search
CPC ...... H02J 3/36; H02J 3/38; H02J 3/386; H01F 30/04; H02B 1/20; H02B 1/26; H02G 9/02

See application file for complete search history.

(56) References Cited

U.S. PATENT DOCUMENTS 3,558,904 A * 1/1971 Kanngiesser ............. H02J 3/36
                                                                307/82
9,048,694 B2 * 6/2015 Pan ........................... H02J 3/46
(Continued)

FOREIGN PATENT DOCUMENTS

DE    102017215821 A1    3/2019
EP        3116085 A1    1/2017
(Continued)

*Primary Examiner* — Robert J Hoffberg
(74) *Attorney, Agent, or Firm* — Laurence A. Greenberg; Werner H. Stemer; Ralph E. Locher (57) ABSTRACT

A device for preparing a high-voltage direct current transmission includes a first busbar which is connectable to a plurality of first energy generation or consumer units and a second busbar which is connectable to a plurality of second energy generation or consumer units. A transformer system includes a first primary coil which is connectable to the first busbar, a second primary coil which is connectable to the second busbar, and a secondary coil system which is inductively coupled to the first primary coil and the second primary coil to transform power routed on the first and second busbars to increased AC voltage. A converter system is connected to the secondary coil system to convert the increased AC voltage into DC voltage for the high-voltage direct current transmission. A converter station and an energy providing system are also provided.

20 Claims, 3 Drawing Sheets

(51) Int. Cl.
　　　*H02J 3/38*　　　　(2006.01)
　　　*H02B 1/26*　　　　(2006.01)
　　　*H02J 3/36*　　　　(2006.01)

(52) U.S. Cl.
　　　CPC ........... *H02J 3/381* (2013.01); *H02J 2300/28*
　　　　　　　　　　　(2020.01); *Y02E 60/60* (2013.01)

(56) References Cited

U.S. PATENT DOCUMENTS

| | | | |
|---|---|---|---|
| 9,197,069 B2 * | 11/2015 | Alston | H02J 3/46 |
| 9,973,125 B2 * | 5/2018 | Brogan | G05F 1/455 |
| 9,998,050 B2 * | 6/2018 | Brogan | F03D 7/0284 |
| 10,063,176 B2 * | 8/2018 | Brogan | F03D 7/0284 |
| 10,072,633 B2 * | 9/2018 | Brogan | F03D 7/0276 |
| 10,468,881 B2 * | 11/2019 | Wagoner | H02J 3/381 |
| 10,916,947 B2 * | 2/2021 | Shen | H02J 3/38 |
| 2016/0013653 A1 | 1/2016 | Dorn et al. | |
| 2018/0302011 A1 | 10/2018 | Ganireddy et al. | |

FOREIGN PATENT DOCUMENTS

| | | | |
|---|---|---|---|
| EP | 3410555 A1 | 12/2018 | |
| WO | WO2014131457 A1 | 9/2014 | |
| WO | WO2018018040 A1 | 1/2018 | |
| WO | WO-2021130158 A1 * | 7/2021 | H02J 5/00 |

* cited by examiner

DEVICE FOR PREPARING A HIGH-VOLTAGE DIRECT CURRENT TRANSMISSION, CONVERTER STATION AND ENERGY PROVIDING SYSTEM

CROSS-REFERENCE TO RELATED APPLICATION

This application claims the priority, under 35 U.S.C. § 119, of European application EP 19179406, filed Jun. 11, 2019; the prior application is herewith incorporated by reference in its entirety.

BACKGROUND OF THE INVENTION

Field of the Invention

The present invention relates to a device for preparing a high-voltage direct current transmission, in particular for installation at sea or on land, a converter station and an energy providing system including, in particular, a plurality of groups of wind turbines.

The electrical power supplied by wind turbines installed at sea or on the seabed has to be transmitted for use by consumers, connected to an electrical transmission network or electrical power grid, on land.

By way of example, a high-voltage direct current transmission (HVDC transmission) can be used for transmission purposes. To that end, the power supplied by the wind turbines in the form of AC voltage has to be transformed to suitable higher voltage and furthermore be converted into DC voltage. The transmission of offshore wind energy by HVDC transmission connections conventionally requires the presence of a plurality of platforms on the high seas. Besides the platform including the rectifier station of the HVDC transmission, that necessitates further platforms (so-called collector platforms), which transform the AC voltage of the wind turbine networks to a higher voltage in order to forward the energy to the HVDC transmission platform. As a result, a complex system is required, which entails considerable costs—in particular by virtue of the multiplicity of offshore platforms.

A comparable objective is found in the linking of large photovoltaic parks or other generation units to a consumer network.

The supply of large loads (consumers) at sea, for example on oil and gas platforms, or of other consumer units may be a further objective which can be achieved by the present invention.

BRIEF SUMMARY OF THE INVENTION

It is accordingly an object of the invention to provide a device for preparing a high-voltage direct current transmission, a converter station and an energy providing system, which overcome the hereinafore-mentioned disadvantages of the heretofore-known devices of this general type and in which the complexity of the respective systems is reduced and the required costs are likewise reduced.

With the foregoing and other objects in view there is provided, in accordance with one embodiment of the invention, a device for preparing a high-voltage direct current transmission, in particular for installation at sea, comprising a first busbar, which is connectable to a plurality of first energy generation or consumer units, in particular wind turbines; a second busbar, which is connectable to a plurality of second generation or consumer units, in particular wind turbines; a transformer system having a first primary coil, which is connectable to the first busbar, a second primary coil, which is connectable to the second busbar, a secondary coil system, which is inductively coupled to the first primary coil and the second primary coil in order to transform power routed on the first and second busbars to increased AC voltage; and a converter system, which is connected to the secondary coil system in order to convert the increased AC voltage into DC voltage for the high-voltage direct current transmission.

The generation units can be e.g. renewable generation units. They may have low power per unit and/or a large spatial extent and/or cumulation to a central point for feeding energy in or out e.g. for long distance transmission by HVDC transmission. The possible problem areas in the case of such networks, such as (high) fault currents, high cable capacitances and charging currents, cable compensation possibly required and harmonics, can be brought under control by division into a plurality of network groups.

Examples of generation units are large photovoltaic arrays or wind turbines.

Examples of consumer units are offshore platforms for example for drilling for oil and gas, e.g. so-called power-from-shore applications.

The busbars can be embodied for example as rigid conductors, for instance copper conductors, in a gas-insulated or solid-insulated fashion. Two or more busbars can be provided depending on how many groups of generation or consumer units are present. A group of generation or consumer units can be defined for example by some or all wind turbines of a wind farm. The respective group of generation or consumer units can be installed for example in a demarcated region within a maritime area. The groups can be defined in each case in such a way that a nominal total power of each of the groups is the same within a deviation of, for example, up to 40% or up to 20% or up to 10%. The busbars can be constructed in such a way that they are able to carry the nominal power of the group of generation or consumer units respectively connected to them, for a given, for example nominal, voltage of the generation or consumer units. Each busbar can be configured for example for carrying an alternating current of between typically 2000 amperes and 4000 amperes. The total current carried by all of the busbars of the device can be between 3000 amperes and 7000 amperes, for example. The first and/or second (and/or each group of further) wind turbines can for example supply their power with an output voltage of between 30 kV and 145 kV, for example, to the respective busbars.

The respective primary coils can be connectable to the associated busbar for example through an interposed switch. During normal operation, the different busbars can be electrically isolated from one another, for example, but could also be connected to one another with the aid of suitable switches. Different primary coils could then likewise be connected to one another through these switches disposed between two busbars.

The transformer system can include one or a plurality of transformers. The respective primary coil denotes that coil section of the transformer system (or of a transformer) which carries the power from the respective group of generation or consumer units during normal operation. The secondary coil system denotes that section of the transformer system (e.g. of one or of a plurality of transformers) which is inductively coupled to the primary coils in order to transform the voltage on the primary coil side to a (higher) voltage on the secondary coil side. The secondary coil system can include one or a plurality of secondary coils.

Each of the secondary coils can be inductively coupled to one or more (e.g. two) primary coils. The designations "primary coil" and "secondary coil" and "secondary coil system" are thus used merely for the respective identification of the respective coil of the transformer system, without necessarily thereby implying that different physical features of the different coils are present.

The transformer system can include exactly the same number of transformers as the number of busbars present. The secondary coil system can include for example exactly the same number of secondary coils as the number of primary coils present. In accordance with this embodiment, exactly one primary coil is inductively coupled to exactly one secondary coil (in order to form a respective transformer), without further secondary coils being inductively coupled to that one primary coil.

In other embodiments, the transformer system can include a number of transformers equal to half the number of busbars present. The secondary coil system then includes fewer secondary coils than primary coils, for example a number of secondary coils equal to half the number of primary coils present. In this case, for example, two or more primary coils are inductively coupled to a single secondary coil (in order to form a respective transformer).

Mixed forms of the two embodiments described above are also conceivable in order to obtain an odd number of busbars.

The converter system can include a parallel connection of a plurality of converters in order to offer different magnitudes of total power as required.

The respective groups of generation or consumer units can be connected to the respective busbar in each case through a corresponding cable from their terminals, without this connection being effected through a so-called collector platform. It was conventional practice to use collector platforms to which a group of wind turbines was connected. The collector platform conventionally includes a transformer in order to transform the power of a specific voltage level supplied by the wind turbines to higher voltage.

In accordance with one preferred embodiment of the present invention, the collector platform is not present. The complexity of the device and also the costs thereof can thus be reduced. By virtue of the embodiment described, in the technical field of offshore wind energy, in the transmission of the energy from the wind turbines to land, a voltage level and the associated equipment (collector platforms and electrical engineering equipment) can be saved. The important tasks of the electrical energy transmission chain can thus be bundled in an integrated station (for example the device for preparing a high-voltage direct current transmission).

Figure 1:
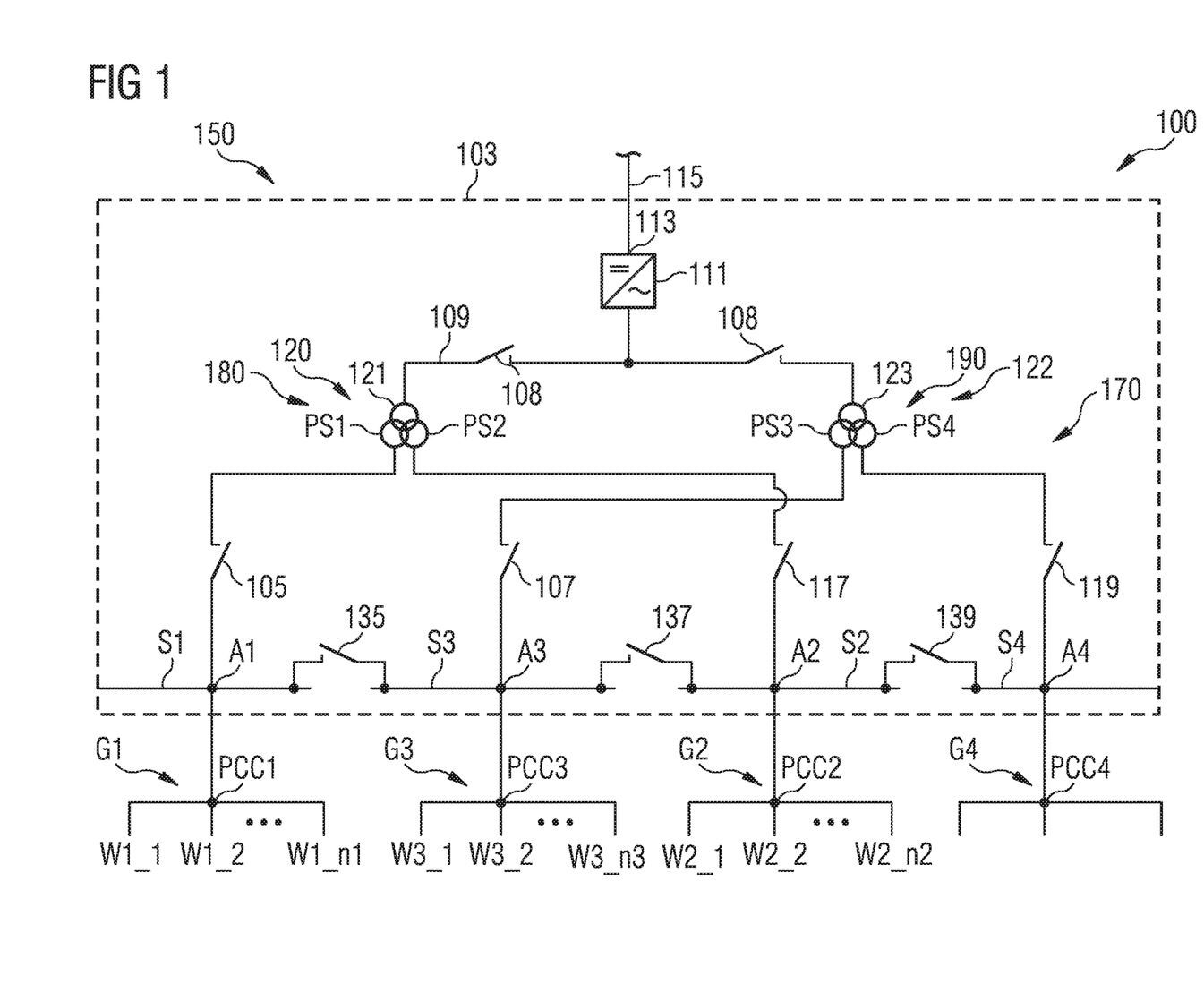
FIG. 1 is a schematic diagram of a converter station in accordance with one embodiment of the present invention and terminals for a plurality of groups of generation or consumer units in order to form an energy providing system in accordance with one embodiment of the present invention.
Figure 2:
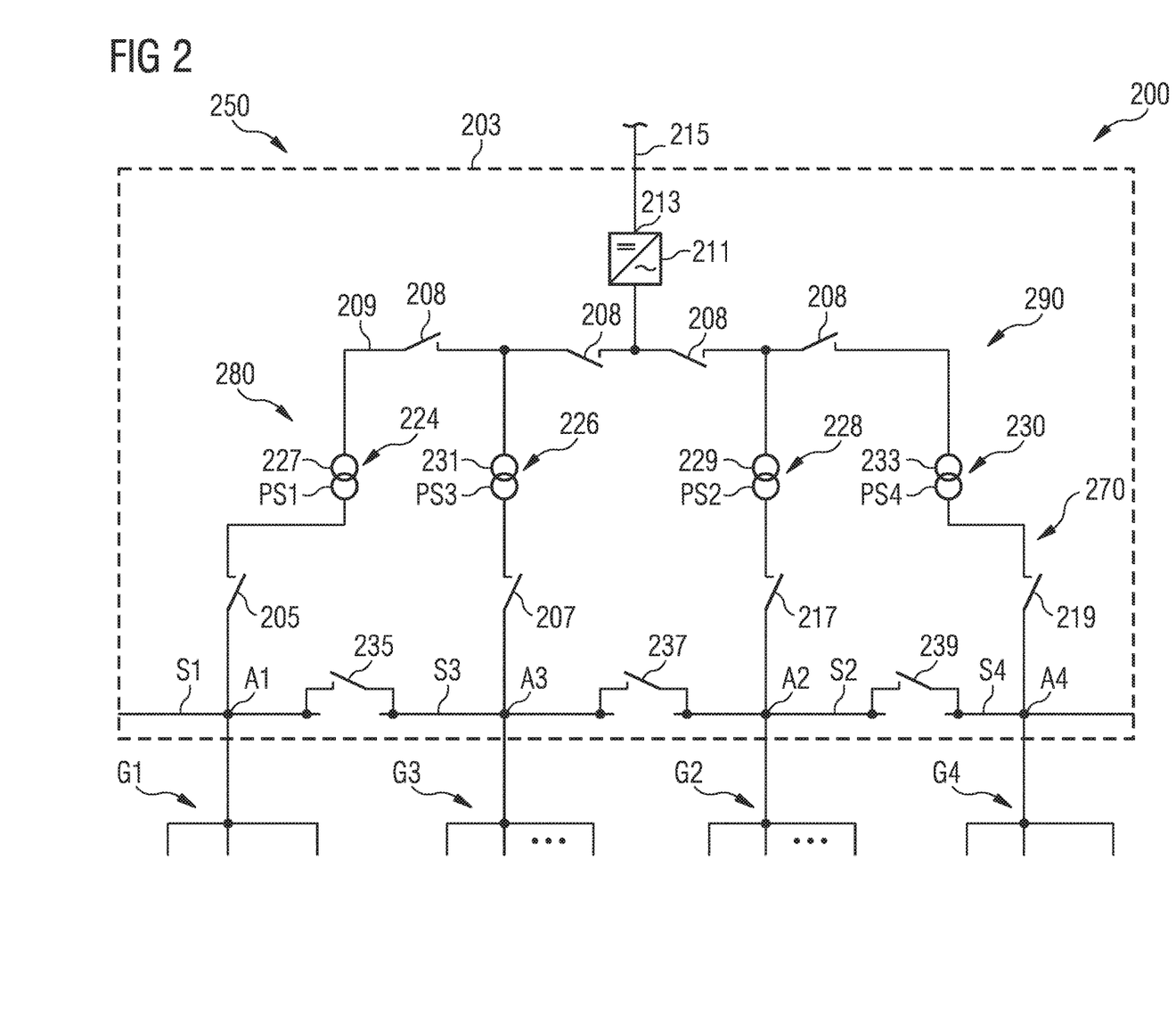
FIG. 2 is a schematic diagram of a converter station in accordance with another embodiment of the present invention and a plurality of groups of generation or consumer units in order to form an energy providing system in accordance with another embodiment of the present invention.

In accordance with one embodiment of the present invention, the device is configured in such a way that the secondary coil system includes a (e.g. exactly one) secondary coil, which is inductively coupled both to the first primary coil and to the second primary coil, wherein the secondary coil is connected or connectable to the converter system. The primary coils can be decoupled, either by a high relative short-circuit voltage between the primary coils (for the embodiment as illustrated in FIG. 1) or by separate transformers (as can be seen in FIG. 2).

The inductive coupling can be established for example by way of a transformer yoke composed of ferromagnetic or soft-magnetic or soft-magnetizable material. A magnetic field generated within the magnetizable material by the respective primary coil can become concentrated within the magnetizable material of the yoke. The magnetizable material of the yoke can be situated for example within both the respective primary coil and the respective secondary coil. The magnetic field that forms in the material surrounded by the respective secondary coil due to the field induced or generated by the primary coil can generate a (higher) voltage in the respective secondary coil.

If more than two busbars are provided, for example four, six, eight or some other even number, then in each case two of the primary coils respectively connected to a busbar can be inductively coupled respectively to one of the secondary coils (in order to form a respective transformer). The number (equal to the number of transformers) of secondary coils can be for example half the number of primary coils. The number of primary coils can be equal to the number of busbars.

In the embodiment described, the number of secondary coils or transformers required can advantageously be reduced, which can save complexity and costs. The secondary coil can include a higher number of turns than each of the primary coils, for example a number of turns at least 2.5 times higher than the primary coil.

In accordance with one embodiment of the present invention, the secondary coil system includes: a first secondary coil, which is inductively coupled to the first primary coil; and a second secondary coil, which is inductively coupled to the second primary coil, wherein in particular the first secondary coil and the second secondary coil are connected or connectable to the converter system.

In accordance with this embodiment, the number of secondary coils (even in the case of more than two busbars) can be equal to the number of primary coils and also equal to the number of transformers. In particular, the first secondary coil can be inductively isolated from the second primary coil and the second secondary coil can also be inductively isolated from the first primary coil.

In particular, all secondary coils (whether the same number as the number of primary coils or a number equal to half the number of primary coils) can jointly be connected or be connectable to the converter system, for example through respective switches.

In accordance with other embodiments of the present invention, in each case a secondary coil can be provided for in each case three or even more primary coils, with the secondary coil being inductively connected to the three or more primary coils (in order to form a transformer). The number of secondary coils could thus be reduced further.

In accordance with one embodiment of the present invention, the device furthermore includes one or a plurality of further busbars, which is/are respectively connectable to a plurality of further generation or consumer units; wherein the transformer system furthermore includes: a further primary coil for each of the one or the plurality of further busbars, with the further primary coil being respectively connectable to one of the one or the plurality of busbars; wherein the secondary coil system is inductively coupled to all further primary coils.

Even in the case of an arbitrary number of further busbars, the secondary coil system can be constructed by a number of secondary coils in a manner analogous to that as described above for two busbars, wherein in each case exactly one secondary coil is inductively coupled to exactly one primary coil or wherein a plurality of the primary coils are inductively coupled in each case to exactly one of the secondary coils.

Embodiments in accordance with the present invention support an arbitrary number of busbars coupled in each case to a primary coil. The system is thus scalable depending on the power to be transmitted.

In accordance with one embodiment of the present invention, the device is configured in such a way that the secondary coil system includes for at least two of the further primary coils, in particular for in each case two of the further primary coils, exactly in each case one further secondary coil, which is inductively coupled to the two of the further primary coils.

In accordance with one embodiment of the present invention, the device is configured in such a way that the secondary coil system includes for at least one, in particular each, of the further primary coils a further secondary coil, which is inductively coupled to the at least one of the further primary coils. Various configurations are thus possible.

In accordance with one embodiment of the present invention, the transformer system has a turns ratio of for example at least 2.5, in particular for example at least between 2.5 and 5, in particular for example between 2.5 and 12. A transformation to a high voltage which is suitable for the high-voltage direct current transmission is thus made possible. A collector platform between the wind turbines and a converter station can thus be dispensed with.

In accordance with one embodiment of the present invention, the device furthermore includes a switch, through which the first busbar is connectable to or disconnectable from the second busbar. During normal operation, the first busbar can be disconnected from the second busbar by the switch. During normal operation, therefore, all the busbars can for example be operated independently of one another and be electrically isolated from one another. In the case of a fault situation (e.g. non-availability of one or a plurality of components), however, the first busbar could be electrically connected to the second busbar by the switch. A greater flexibility of the assignment between the busbars and the different primary coils is thus made possible.

In accordance with one embodiment of the present invention, the device includes further switches, through which each of the one or the plurality of further busbars is connectable to or is disconnectable from every other of the one or the plurality of further busbars.

In accordance with one embodiment of the present invention, the device furthermore includes: in each case a switch, through which the respective busbar is connectable to the respective primary coil or is disconnectable from the respective primary coil.

If a fault occurs in the primary coil connected to the switch, for example, then this switch (and optionally further switches) can be opened. Further operation can thus be made possible even in the case of partly damaged or non-functional components.

In accordance with one embodiment of the present invention, the device is configured in such a way that a voltage of between 30 kV and 145 kV is able to be applied to the busbars, wherein the transformer system is configured to transform to a voltage of for example between 150 kV and 525 kV. Conventionally achieved electrical voltages which occur for offshore wind energy installations, for example, are thus supported. The transformer system can be configured, in particular, to transform between a voltage of 66 kV and 380 kV. One or a plurality of collector platform(s) between the wind energy installations and the converter station/HVDC transmission offshore platform can thus be dispensed with.

In accordance with one embodiment of the present invention, the device furthermore includes: a switch controller in order to switch switches operationally or in the case of a fault of a component and/or during partial load operation, in order to electrically isolate the faulty component and/or parts of the system from the rest of the system and/or to connect non-faulty components to one another. The system can thus continue to be operated by corresponding switching of the switches even in the partial load range or in the case of inoperability or restricted functionality of one or a plurality of components.

With the objects of the invention in view, there is also provided a converter station, comprising: a device in accordance with any of the preceding embodiments; a housing accommodating the device; and in particular a seabed anchoring in order at sea to anchor the housing in the seabed above the water surface, or in particular a float apparatus carrying the housing.

The housing can contain all busbars, all transformers (all primary coils of the transformer system and also the entire secondary coil system of the transformer system). The converter station is thus different than a system composed of one or a plurality of collector platform(s) spatially separated from a converter station, such as was/were conventionally used.

In accordance with another embodiment of the present invention, the components of the device, that is to say substantially busbars, switches and transformers, in accordance with any of the preceding embodiments, are set up outside without a housing.

With the objects of the invention in view, there is furthermore provided an energy providing system, comprising: a plurality of groups of wind turbines; a converter station in accordance with the preceding embodiment, wherein each group of wind turbines is connected (directly) to a busbar of the converter station, wherein the voltage applied or output by the group of wind turbines, apart from losses, is equal to the voltage applied to the busbar. A transformation of the voltage between an output terminal of the wind turbines and the respective busbar is dispensable.

In accordance with an added feature of the invention, the first primary coil and the second primary coil have mutually defined inductive coupling properties, and values for a relative short-circuit voltage are in a range of 30% to 60%. Additionally or alternatively, the first primary coil and the second primary coil have mutually defined inductive coupling properties, and a ratio of a relative short-circuit voltage between the first primary coil and the second primary coil, and a relative short-circuit voltage between the secondary coil and a respective one of the first primary coil and the second primary coil is 1.5 to 3.

Other features which are considered as characteristic for the invention are set forth in the appended claims.

Although the invention is illustrated and described herein as embodied in a device for preparing a high-voltage direct current transmission, a converter station and an energy providing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly, to FIG. 1 thereof, there is seen a schematically-illustrated energy providing system 100 including a plurality of groups G1, G2, G3, G4 of wind turbine groups, namely WT1_1, WT1_2, WT1_3, . . . , WT1_$n$1; W2_1, W2_2, . . . , W2_$n$2; W3_1, W3_2, . . . , W3_$n$3 and W4_1, W4_2, . . . , W4_$n$4. In this case, a first group G1 is formed by the wind turbine groups W1_1, W1_2, . . . , W1_$n$. A second group G2 is formed by the wind turbine groups W2_1, W2_2, . . . , W2_$n$2.

Each group WTx_y can be formed of one or (as a WTG string) of a plurality of wind turbines.

Furthermore, the energy providing system 100 includes a converter station 150 in accordance with one embodiment of the present invention, wherein each group G1, G2, G3, G4 is connected (in particular directly) to a respective busbar S1, S2, S3, S4.

The voltage applied or output by the group of wind turbines, apart from losses, is equal to the voltage applied to the busbar. In particular, respective nodes PPC1, PPC2, PPC3, PPC4, to which the first group G1 of wind turbines, the second group G2, the third group G3 and the fourth group G4 of wind turbines are respectively connected, without an interposed transformer, are connected to terminal points A1, A2, A3, A4 respectively connected to the busbars S1, S2, S3, S4.

The converter station 150 includes a device 170 for preparing a high-voltage direct current transmission in accordance with one embodiment of the present invention, and also in particular a housing 103 accommodating the device 170. The housing 103 can be anchored to the seabed in particular by way of a seabed anchoring (not illustrated), in such a way that the housing 103 is situated above the surface of the sea.

The device 170 for preparing a high-voltage direct current transmission includes the first busbar Sl, which is connected to the group G1 of wind turbines WT1_1, WT1_2, . . . , WT1_$n$1. The device 170 furthermore includes the second busbar S2, which is connected to a second group G2 of second wind turbines W2_1, W2_2, . . . , W2_$n$2. Furthermore, the device 170 includes the third busbar S3 and the fourth busbar S4, which are connected to the third group G3 and the fourth group G4 of wind turbines, respectively.

The device 170 furthermore includes a transformer system 180 having a first primary coil PS1, which is connectable to the first busbar S1 through a switch 105. The transformer system 180 furthermore includes a second primary coil PS2, which is connectable to the second busbar S2 through a switch 117.

The transformer system 180 furthermore includes a secondary coil 121, which is inductively coupled to the first primary coil PS1 and the second primary coil PS2 in order to transform voltage carried on the first and second busbars S1, S2 to increased AC voltage at a secondary output busbar 109. The primary coils PS1 and PS2 are decoupled from one another as much as possible. The secondary coils 121, 123 are connectable to or disconnectable from the converter system 111 by (optional) switches 108 (e.g. switchable independently of one another).

The device 170 furthermore includes a converter system 111, which is connected to the secondary coil system 190 (which includes coils 121, 123), in particular to the secondary busbar 109, in order to convert the increased AC voltage into DC voltage at an output terminal 113 of the converter system 111 for the high-voltage direct current transmission along a DC transmission line (cable and/or overhead line) 115.

The third busbar S3 is connectable to a third primary coil PS3, and the fourth busbar S4 is connectable to a fourth primary coil PS4, by respective switches 107, 119. The transformer 122 including the coils PS3, PS4 and 123 is described in greater detail below.

Elements which are similar or identical in terms of structure and/or function in FIGS. 1 and 2 are designated by reference signs which differ merely in the first digit. A description of an element which has not been described in detail with reference to a specific embodiment can be inferred from the description of this element with reference to another embodiment.

FIGS. 1 and 2 illustrate two devices 170 and 270, which are included in a respective converter station 150 and 250, of a respective energy providing system 100 and 200, which differ in the configuration of the respective transformer system 180 and 280.

In the embodiment illustrated in FIG. 1, the secondary coil system 190 includes a secondary coil 121, which is inductively coupled both to the first primary coil PS1 and to the second primary coil PS2 in order to form a transformer 120. The two primary coils PS1 and PS2 are decoupled from one another as much as possible by virtue of the transformer construction and choice of a large relative short-circuit voltage between these two windings.

Furthermore, the third primary coil PS3 and also the fourth primary coil PS4 are inductively connected to a further secondary coil 123 in order to form a transformer 122. The secondary coil outputs of the secondary coils 121, 123 are jointly connected to the secondary busbar 109 and thus also to the converter system 111. In the secondary busbar 109, and a switch 108 can be provided for each branch (i.e. toward each secondary coil 121, 123).

The transformer 120 includes the primary coils PS1, PS2, which are inductively coupled to the secondary coil 121. The transformer 122 includes the primary coils PS3, PS4, which are inductively coupled to the secondary coil 123.

In the embodiment 200 of an energy providing system in accordance with one embodiment of the present invention, which embodiment 200 is illustrated schematically in a similar way in FIG. 2, the transformer system 280 is embodied differently with regard to the primary and respectively secondary coils. In this case, the transformer system 280 includes a first secondary coil 227, which is inductively coupled to the first primary coil PS1 (in order to form a transformer 224), and furthermore includes a second secondary coil 229, which is inductively coupled to the second primary coil PS2 (in order to form a transformer 228).

The transformer system 280 of the embodiment illustrated in FIG. 2 includes the transformer 224 including the primary coil PS1 and the secondary coil 227, the transformer 226 including the primary coil PS3 and the secondary coil 231, the transformer 228 including the primary coil PS2 and the secondary coil 229, and also the transformer 230 including the primary coil PS4 and the secondary coil 233.

Both the first secondary coil 227 and the second secondary coil 229 (and also the secondary coils 231, 233) are connected or connectable to the converter system 211 through a secondary busbar 209 (optionally through one or a plurality of switches 208, e.g. switchable independently of one another). For each further primary coil, e.g. the primary coils PS3, PS4, the transformer system 280 of the embodiment illustrated in FIG. 2 includes a respective assigned secondary coil 231 and/or 233, which is inductively coupled to the respective primary coil PS3 and/or PS4.

The embodiments illustrated in FIGS. 1 and 2 can be extended to as many busbars with assigned primary coils as desired. In this case, it is not necessary for exactly one secondary coil to be inductively coupled to each primary coil nor is it necessary for exactly two (or more) primary coils to be inductively coupled to exactly one secondary coil, rather a configuration can also be present, wherein some of the primary coils are coupled to exactly one secondary coil and two or more of the primary coils are coupled to a respective secondary coil.

In the embodiments illustrated in FIGS. 1 and 2, the individual busbars can optionally be connected to or disconnected from one another in pairs by respective (optional) switches 135, 137, 139. The busbars (or terminal points A1, A2, A3, A4) can also (optionally) be connected or connectable in the shape of a ring through switches. By way of example, terminal points A1, A4 can be connectable through a switch (not illustrated).

The converter systems 111, 211, merely illustrated schematically in FIGS. 1 and 2, can include one or a plurality of AC-DC converters, which are connected in parallel with the secondary busbar 109 and 209, respectively, to which all of the secondary coils are connected or connectable as well.

The respective devices 100 and 200 can also include a switch controller (not illustrated) in order to switch the (in part optional) switches 105, 107, 117, 119, 135, 137, 139 in the case of a fault of a component or/and a partial load range in order to electrically isolate the faulty component and/or parts of the system from the rest of the system and/or to connect non-faulty components to one another.

Figure 3:
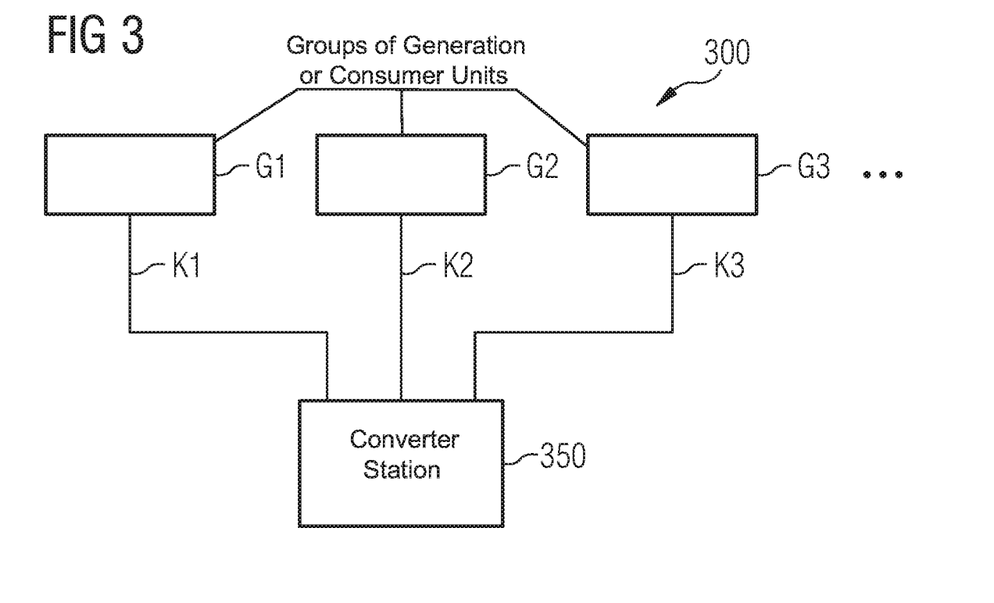
FIG. 3 is a simplified block diagram of an energy providing system in accordance with one embodiment of the present invention.

FIG. 3 shows, in a simplified, block diagram, an energy providing system 300 in accordance with one embodiment of the present invention, which energy providing system includes a plurality of groups G1, G2, G3 of generation or consumer units and also a converter station 350 in accordance with one embodiment of the present invention, which can be configured in a manner similar to the respective converter station 150, 250 illustrated in FIG. 1 and FIG. 2.

The length of the feed cables K1, K2, K3 between the groups G1, G2 and G3 of generation or consumer units and the converter station 350 can be between 1 km and 15 km, for example.

By virtue of the direct, parallel operation of two or more transformers 120, 122 and 224, 226, 228, 230, respectively, with a high-voltage converter 111, 211, further voltage matching on the collector platforms or stations 441 (as is illustrated for the prior art in FIG. 4) can become superfluous.

The saving of the collector platform is made possible since the AC medium voltage fed directly from the generation or consumer units can be transformed in one step to an AC high voltage required for the HVDC transmission power converter in accordance with embodiments of the present invention.

The generation or consumer units connected to the integrated platform or station (e.g. converter station 150 or 250 illustrated in FIG. 1 or FIG. 2, respectively) are not connected to a single busbar, but rather, depending on the grouping of the connected generation or consumer units, are divided among a plurality of busbar sections or busbars S1, S2, S3, S4 and separated from one another. The separation of the individual busbars can be characterized as follows:

Each group of generation or consumer units can have a dedicated busbar section or terminal (e.g. A1, A2, A3, A4).

Each busbar section or each busbar can have a dedicated transformer outgoing connection and can be connected thereto during normal operation.

In each case two or more of these busbar sections or busbars can be electrically connected to one another by switchable elements.

As a result of the partial or complete separation of the busbars (e.g. S1, S2, S3, S4) during operation it is possible in fault situations, for example, to reduce the effects on the rest of the electrical system. In situations in which subsystems (e.g. transformer units) have failed, are undergoing maintenance or are in partial load operation, further operation of the energy providing system can be ensured by targeted coupling of the different busbars (e.g. S1, S2, S3, S4).

Figure 4:
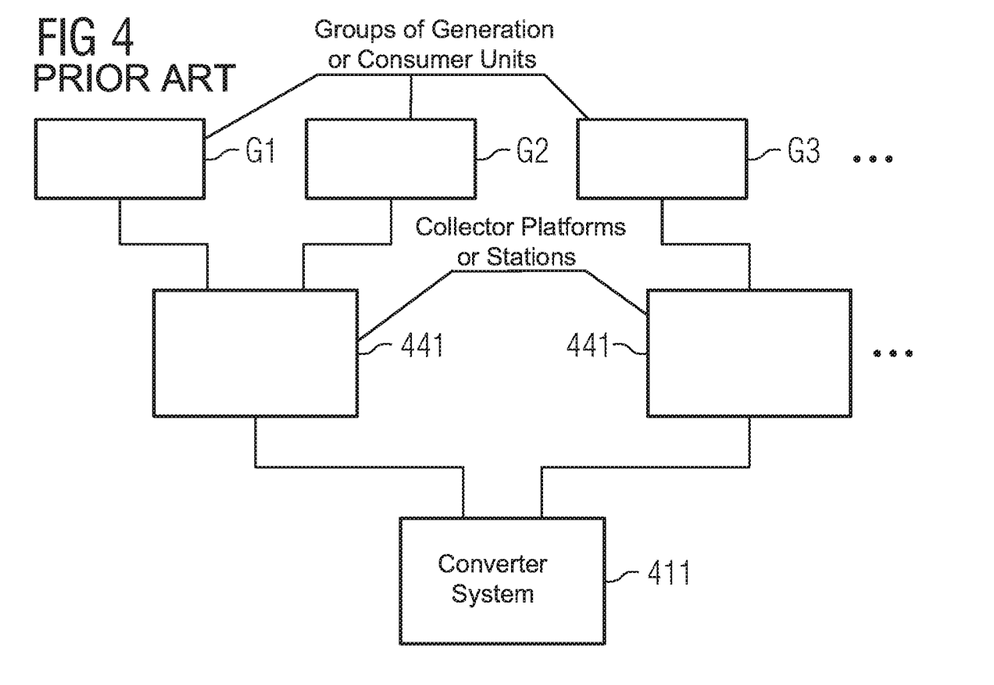
FIG. 4 is a simplified block diagram of an energy providing system in accordance with the prior art.

FIG. 4 shows, in a block diagram, a conventional energy providing system, wherein collector platforms or stations 441 that transform to a higher voltage are respectively disposed between the groups G1, G2, G3 of generation or consumer units and the converter system 411. The collector platforms or stations 441 can be dispensed with in accordance with embodiments of the present invention.

The device for preparing an HVDC transmission can include a regulation system configured:

a) to regulate the AC voltage of the busbar 109 with respect to magnitude, frequency (and phase angle), without a further impedance taking effect between transformer and power converter 111 or respectively 211 (e.g. by virtue of external circuitry);

b) to carry out the regulation of the active power or the limiting thereof and of the reactive power by stipulations for each busbar S1 to S4 (or of the primary coils corresponding thereto).

The regulation system can be formed by a plurality of physically separate regulating systems, e.g. including:

a converter for the voltage regulation at the busbar 109;

a configuration for a wind farm or a PV park regulation or load management for reactive power regulation and optionally active power limiting.

Limiting of the active power that is valid for all connected generation or consumer units can be achieved by stipulation of the frequency of the AC voltage at the busbar 109 by the power converter if the generation or consumer units have corresponding devices demanded according to the relevant grid codes.

The star point treatment of the partial networks defined by the respective primary coils can preferably be effected by way of star points of the star-connected primary coils; alternatively, the star point treatment can be effected by way of separate apparatuses for example at the respective busbars, at each individual string outgoing connection or in one generation or consumer unit per string.

The cable capacitances can also be compensated for by way of separate apparatuses (inductors) per busbar or per string or at the generation or consumer unit.

The invention claimed is:

1. A device for preparing a high-voltage direct current transmission, the device comprising:
   a first busbar configured to be connected to a plurality of first energy generation or consumer units;
   a second busbar configured to be connected to a plurality of second energy generation or consumer units;
   a transformer system including: a first primary coil configured to be connected to said first busbar, a second primary coil configured to be connected to said second busbar, and a secondary coil system inductively coupled to said first primary coil and said second primary coil to transform power routed on said first and second busbars to an increased AC voltage;
   a converter system connected to said secondary coil system to convert the increased AC voltage into a DC voltage for the high-voltage direct current transmission; and
   a switch configured for connecting said first busbar to said second busbar and for disconnecting said first busbar from said second busbar;
   wherein in normal operation of said device, said first busbar is separated from said second busbar by said switch.

2. The device according to claim 1, wherein said secondary coil system includes a secondary coil inductively coupled both to said first primary coil and to said second primary coil, and said secondary coil is connected or configured to be connected to said converter system.

3. The device according to claim 2, wherein said first primary coil and said second primary coil have mutually defined inductive coupling properties, and values for a relative short-circuit voltage are in a range of 30% to 60%.

4. The device according to claim 2, wherein said first primary coil and said second primary coil have mutually defined inductive coupling properties, and a ratio of a relative short-circuit voltage between said first primary coil and said second primary coil, and a relative short-circuit voltage between said secondary coil and a respective one of said first primary coil and said second primary coil is 1.5 to 3.

5. The device according to claim 2, which further comprises:
   at least one further busbar configured to be connected to a plurality of further energy generation units;
   another secondary coil of said secondary coil system; and
   at least one of:
      at least one further switch for at least one of connecting said at least one further busbar to or disconnecting said at least one further busbar from each, or
      at least one secondary-side switch for connecting said secondary coil of said secondary coil system to said converter system or for disconnecting said secondary coil of said secondary coil system from said converter system.

6. The device according to claim 1, wherein said secondary coil system includes a first secondary coil inductively coupled to said first primary coil and a second secondary coil inductively coupled to said second primary coil, and said first secondary coil and said second secondary coil are connected or configured to be connected to said converter system.

7. The device according to claim 1, which further comprises:
   at least one further busbar configured to be connected to a plurality of further energy generation units;
   said transformer system further including:
      at least one further primary coil for said at least further busbar, said at least one further primary coil configured to be connected to said at least one further busbar; and
      said secondary coil system being inductively coupled to said at least one further primary coil.

8. The device according to claim 7, wherein said at least one further primary coil includes at least two further primary coils, and said secondary coil system includes one further secondary coil inductively coupled to said at least two further primary coils.

9. The device according to claim 7, wherein said at least one further primary coil includes at least two further primary coils, and said secondary coil system includes one further secondary coil inductively coupled to at least one of said at least two further primary coils.

10. The device according to claim 1, wherein said transformer system has a turns ratio of at least 2.5.

11. The device according to claim 1, wherein said transformer system has a turns ratio of at least between 2.5 and 5.

12. The device according to claim 1, wherein said transformer system has a turns ratio of between 2.5 and 12.

13. The device according to claim 1, which further comprises switches each connecting a respective one of said first and second busbars to a respective one of said first and second primary coils or disconnecting a respective one of said first and second busbars from said respective one of said first and second primary coils.

14. The device according to claim 1, wherein said busbars are configured to receive a voltage of between 30 kV and 145 kV, and said transformer system is configured to transform to a voltage of between 150 kV and 525 kV.

15. The device according to claim 1, wherein said secondary coil system includes a secondary coil and another secondary coil, and said converter system includes at least one AC-DC converter connected to a secondary busbar to which said secondary coil and said another secondary coil are connected.

16. The device according claim 1, which further comprises a switch controller configured for, upon a fault of a component or during a partial load operation, controlling said switch to (a) electrically isolate the faulty component or (b) connect non-faulty components of the device to one another.

17. The device according to claim 1, wherein the device prepares the high-voltage direct current transmission for installation at sea, and the first and second energy generation or consumer units are wind turbines.

18. The device according to claim 1, configured to at least one of:
   a) regulate an AC voltage of a secondary busbar with respect to at least one of magnitude or frequency or phase angle, without a further impedance taking effect between said transformer system and said converter system, b) carry out a regulation of an active power or a limiting of an active power and of a reactive power by stipulations for each busbar or of said primary coils corresponding thereto, or c) carry out a limiting valid for an entire connected active power by stipulation of a frequency of an AC voltage at a secondary busbar by using said converter.

19. A converter station, comprising:
a device according to claim 17;
a housing accommodating said device; and
a seabed anchoring for anchoring said housing in the seabed above the water surface at sea or a float apparatus for carrying said housing at sea.

20. An energy providing system, comprising:
a plurality of groups of energy generation or consumer units; and
a converter station including a device for preparing a high-voltage direct current transmission, the device including:
   a first busbar configured to be connected to a plurality of first energy generation or consumer units of said plurality of groups of energy generation or consumer units;
   a second busbar configured to be connected to a plurality of second energy generation or consumer units of said plurality of groups of energy generation or consumer units;
   a transformer system including: a first primary coil configured to be connected to said first busbar, a second primary coil configured to be connected to said second busbar, and a secondary coil system inductively coupled to said first primary coil and said second primary coil to transform power routed on said first and second busbars to an increased AC voltage;
   a converter system connected to said secondary coil system to convert the increased AC voltage into a DC voltage for the high-voltage direct current transmission; and
   a switch configured for connecting said first busbar to said second busbar and for disconnecting said first busbar from said second busbar;
   wherein in normal operation of said device, said first busbar is separated from said second busbar by said switch;
the energy providing system additionally comprising:
a housing accommodating said device;
a seabed anchoring for anchoring said housing in the seabed above the water surface at sea or a float apparatus for carrying said housing at sea; and
a plurality of busbars, said plurality of busbars including said first busbar and said second busbar;
each of said groups of energy generation or consumer units being connected indirectly or directly to at least one of said plurality of busbars of said converter station; and
a voltage applied to or output by each of said plurality of groups of energy generation or consumer units, apart from losses, being equal to a voltage applied to a respective one of said busbars connected to said plurality of groups of energy generation or consumer units.

* * * * *